April 2, 1957　　　W. F. THOMPSON, JR　　　2,787,440
TURBINE APPARATUS
Filed May 21, 1953

INVENTOR
WILLIAM F. THOMPSON JR.
BY
ATTORNEY

United States Patent Office 2,787,440
Patented Apr. 2, 1957

2,787,440

TURBINE APPARATUS

William F. Thompson, Jr., Philadelphia, Pa., assignor to Westinghouse Electric Corporation, East Pittsburgh, Pa., a corporation of Pennsylvania Application May 21, 1953, Serial No. 356,464

8 Claims. (Cl. 253—39.1)

This invention relates to turbines, and more particularly to cooling means for the rotary and stationary blades or vanes of a turbine.

One object of the invention is the provision of improved blade structure having internal passages adapted for circulation of a fluid cooling medium.

Another object of the invention is the provision of means for distributing and regulating the flow of cooling medium through the blades or vanes of a gas turbine or high temperature steam turbine, to facilitate the use of readily procurable alloys and to permit operation with high cycle top temperatures.

In any turbine employing hollow blades or vanes with means for conducting cooling fluid therethrough, the magnitude of the cooling effect is in general proportional to some power of the weight flow rate of the fluid. The present invention provides means by which the weight flow rate of cooling medium through each rotary blade or stationary vane can be automatically regulated to maintain a nearly constant wall temperature over a range of cycle top temperatures.

It is a further object of the invention to provide an improved fluid cooled turbine blade or vane having an axially extending internal passage with an inlet opening at one end and an outlet opening at the other, and including a stationary stem disposed axially in the passage and carrying a head for varying the flow area of the outlet opening upon differential expansion of the blade relative to the stem.

Figure 1:
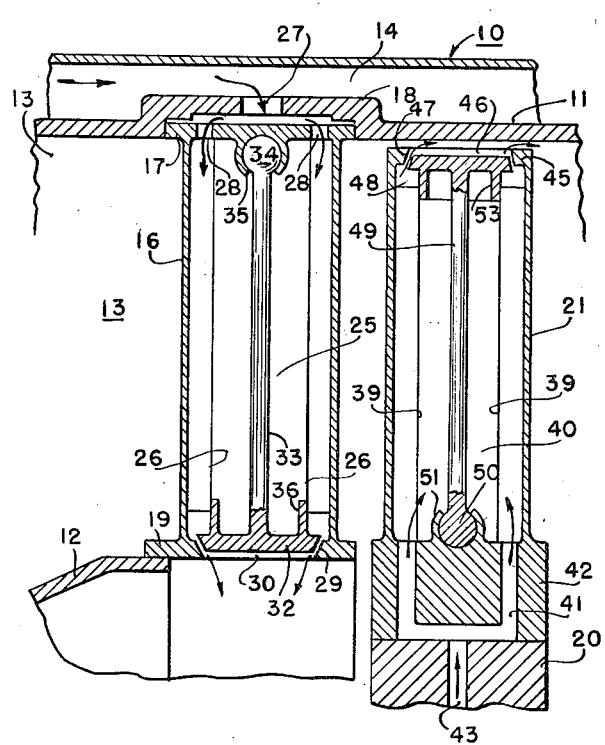
Figure 2:
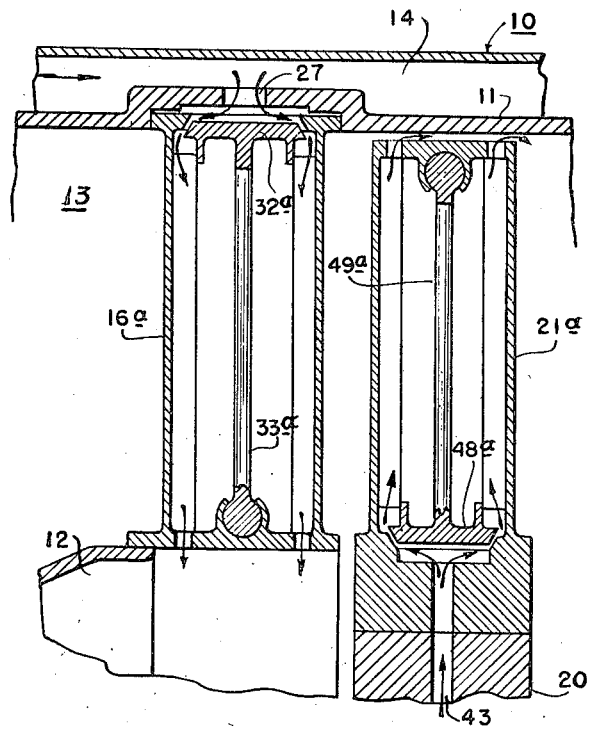

These and other objects are effected by the invention as will be apparent from the following description taken in connection with the accompanying drawings, forming a part of this application, in which:

Fig. 1 is a fragmentary sectional view of a portion of a turbine equipped with vane and rotary blade means constructed in accordance with the invention; and Fig. 2 is a similar view illustrating a vane and blade constructed in accordance with a different form of the invention.

As shown in Fig. 1, a gas turbine engine having a cylindrical outer casing structure 10 is provided with an inner wall 11 and suitable core structure 12 forming an annular motive gas passage 13 and an encompassing cooling fluid passage 14. Spanning the passage 13 is a stationary diaphragm vane assembly comprising a plurality of radially disposed hollow vanes 16, each of which has an outer end 17 mounted in a groove 18 in the wall 11 and an inner end 19 supported on the core structure 12. A turbine rotor 20 is suitably mounted in the engine and carries a plurality of radially arranged hollow blades 21, which extend into the motive gas passage 13 downstream of the stationary vanes 16.

According to the invention as illustrated in Fig. 1, each vane 16 has formed therein a passage 25 which extends axially of the vane. A plurality of interior heat radiating fins 26 may extend into this passage. These fins also constitute heat conducting and convecting elements. Outwardly of each vane the wall 11 is provided with a passage 27 which communicates with ports 28 in the vane outer end 17 to admit cooling fluid from the passage 14 to the vane passage 25. The inner end 19 of each vane is provided with a valve seat 29 forming a discharge opening 30 for venting cooling fluid from the passage 25. Disposed in operating alignment with the valve seat 29 is a valve 32 which is carried on the inner end of a stem 33, the outer end of which is suitably connected to the outer end 17 of the vane. In the embodiment illustrated, a rounded end or ball portion 34 is formed on the stem and engaged in a socket portion 35 carried by the outer end 17 of the vane. A flange 36 is formed on the valve 32 for guiding engagement with the inner ends of the fins 26.

Each rotary blade 21 has formed therein a plurality of cooling fins 39 extending into an axial passage 40, which communicates through inlet ports 41 in the inner end 42 with a cooling fluid supply passage 43 formed in the rotor 20. At the outer end 45 of each blade 21, a discharge opening 46 forms a valve seat 47 for receiving a valve 48 carried on the outer end of a stem 49. An inner end or ball portion 50 of the stem is engaged in a socket portion 51 of the blade end 42. A flange 53 of the valve 48 is guided by engagement with adjacent surfaces of the fins 39.

When the engine is put into operation, hot motive fluid is supplied to the passage 13 from a suitable source (not shown), while cooling fluid from a suitable source (not shown) is conducted through the passages 14 and 43. The walls of the vanes 16 and blades 21 then rapidly become much hotter than the respective stems 33 and 49, and the vanes and blades consequently lengthen relatively in accordance with the thermal expansion coefficients of the alloys of which they are made. Since the stems are well insulated from the hot motive fluid and from the associated vane and blade outer walls, thermal expansion of the stems will be relatively less than that of the walls. Flow of cooling fluid over the stems also limits heating thereof. As each vane 16 expands relative to its stem 33, the flow area of the outlet opening 30 is increased to allow passage of more cooling fluid, as indicated in Fig. 1. In like manner, the relative expansion of each blade 21 effects an increase in the flow of cooling fluid past the associated valve 48.

As shown in Fig. 2 of the drawing, the relative positions of the valves and stems in the respective vanes and blades may be reversed, if preferred. Thus, each vane 16a may have a stem 33a secured at the inner end thereof, with a valve 32a adapted to limit inflow of cooling fluid from the passage 14. In like manner, the position of a valve 48a and stem 49a in each rotary blade 21a, shown in Fig. 2, may be the reverse of that for the blade 21 shown in Fig. 1.

It will now be apparent that the hollow, fluid cooled vanes or blades having regulating stems and valves constructed and arranged according to the invention will provide more efficient cooling than that afforded with constructions heretofore proposed. The use of the improved vanes and blades will render any suitably equipped engine apparatus, such as a gas turbine engine, operative at relatively constant efficiency, since the flow rate of cooling fluid will be reduced at low engine temperatures, and increased at high engine temperatures, as during operation on hot days. The improved construction will minimize the effect of hot spots, since all stationary vanes subjected to hot spot temperatures will tend to pass more cooling fluid. In the case of a typical fluid cooled gas turbine blade having the improved construction, for example, a rise of 275° F. in motive gas temperature might effect an increase of about 100° F. in blade temperature, while a conventional blade lacking the regulating valve and stem features of the invention would be subjected to a temperature rise of about 240° F.

While the invention has been shown in several forms, it will be obvious to those skilled in the art that it is not so limited, but is susceptible of various other changes and modifications without departing from the spirit thereof.

What is claimed is:

1. In a vane or blade structure for a turbine, an airfoil body having a passage formed along the axis thereof, said passage having an always open cooling fluid inlet at one end and a cooling fluid outlet opening at the opposite end, a valve cooperative with said outlet opening to vary the flow area thereof, a stem secured to said valve and extending through said passage to the other end of the body, and means securing said stem to the end of said body opposite that adjacent said valve.

2. In a vane or blade structure for a turbine, an airfoil body having a passage formed along the axis thereof, said passage communicating with cooling fluid outlet and inlet openings formed in the opposite ends of said body, a valve cooperative with one of said openings to vary the flow area thereof, a stem disposed in said passage and having one end formed integral with said valve, and means securing the other end of said stem to the end of said body opposite that adjacent said valve.

3. A device as set forth in claim 2 wherein the stem is spaced within the passage in the body to avoid contact with the side wall thereof.

4. A device as set forth in claim 2 wherein the means securing the end of the stem comprises a ball and socket assembly.

5. A device as set forth in claim 2 wherein heat radiating fins formed in the body extend into the axial passage, and slidably engage the valve for guiding the latter during differential expansion of the body relative to the stem.

6. A device as set forth in claim 2 including stationary diaphragm means holding the body in place.

7. A device as set forth in claim 2 including a turbine rotor secured to one end of the body.

8. In a turbine having a plurality of stationary vane elements and rotary blade elements, structure for at least one of such elements comprising a hollow body having cooling fluid inlet and outlet openings formed therein, valve means cooperative with one of said openings for varying the rate of flow of cooling fluid therethrough, and means controlling said valve in accordance with the temperature of said element regardless of temperatures of the associated elements in the turbine.

References Cited in the file of this patent

FOREIGN PATENTS 242,703     Switzerland _____ Nov. 1, 1946